(12) United States Patent
Sutton

(10) Patent No.: US 6,276,710 B1
(45) Date of Patent: Aug. 21, 2001

(54) ARTICULATING AIR SPRING SUSPENSION FOR TANDEM AXLE

(75) Inventor: Anthony D. Sutton, Fort Wayne, IN (US)

(73) Assignee: Inernational Truck and Engine Corporation, Warrenville, IL (US)

( * ) Notice: Subject to any disclaimer, the term of this patent is extended or adjusted under 35 U.S.C. 154(b) by 0 days.

(21) Appl. No.: 09/553,003

(22) Filed: Apr. 19, 2000

(51) Int. Cl.$^7$ ........................................... B60G 5/00
(52) U.S. Cl. ........................ 280/678; 280/124.128; 280/124.159; 280/124.16; 280/124.161; 280/683; 280/676
(58) Field of Search ............... 280/124.128, 124.159, 280/124.16, 124.161, 678, 683, 676

(56) References Cited

U.S. PATENT DOCUMENTS

| | | | | |
|---|---|---|---|---|
| 4,030,738 | * | 6/1977 | Willetts | 280/681 |
| 4,132,433 | * | 1/1979 | Willetts | 280/712 |
| 4,705,294 | * | 11/1987 | Raidel | 280/711 |
| 4,993,729 | | 2/1991 | Payne . | |
| 5,052,712 | * | 10/1991 | Raidel | 280/702 |
| 5,058,917 | * | 10/1991 | Richardson | 280/704 |
| 5,458,360 | * | 10/1995 | Raidel, Sr. | 280/686 |
| 5,464,245 | * | 11/1995 | Vogler | 280/720 |
| 5,560,641 | * | 10/1996 | Vogler | 280/720 |
| 5,588,665 | * | 12/1996 | Pierce et al. | 280/704 |
| 5,615,906 | * | 4/1997 | Raidel, Sr. | 280/686 |
| 5,882,031 | * | 3/1999 | VanDenberg | 280/683 |
| 6,149,142 | * | 11/2000 | Penzotti | 267/64.19 |
| 6,193,266 | * | 2/2001 | Cortez et al. | 280/677 |

OTHER PUBLICATIONS

Goodyear, Super Cushion Air Springs, Vehicular Applications Engineering Manual, Jun. 1997, pp. 3 + 38 + front and back covers, reprinted from SAE Publication HS1576, Society of Automotive Engineers, INc.

* cited by examiner

Primary Examiner—Eric Culbreth
Assistant Examiner—Deanna Draper
(74) Attorney, Agent, or Firm—Jeffrey P. Calfa; Dennis Kelly Sullivan; Gilberto Hernandez

(57) ABSTRACT

A suspension system for a vehicle tandem axle has air springs positioned adjacent the ends of the trailing and lead axles of the tandem axle. Pairs of air springs on each side of the vehicle are pneumatically connected to form a common reservoir. Displacement of the ends of the lead and trailing axles of the tandem axle are averaged to provide a controlling input to air spring pressurization controllers provided for each pair of air springs.

7 Claims, 3 Drawing Sheets

ARTICULATING AIR SPRING SUSPENSION FOR TANDEM AXLE

BACKGROUND OF THE INVENTION

1. Field of the Invention

The present invention relates to suspensions for tandem axles and more particularly to high articulation suspensions for driven tandem axles.

2. Description of the Prior Art

A tandem axle is commonly employed to a support a heavy load such as the rear sections of heavy duty vehicles. Among suspensions commonly used with tandem axles are systems which provide a leaf or air spring for each end of the leading and trailing axles of the tandem pair and suspensions based on walking or equalizing beams. Walking beam suspensions for a tandem axle typically include two beams, each mounted perpendicularly to the axles and riding on the axles toward the outside ends of the axles. A single spring, which may be a rubber spring or steel spring, is mounted above the walking beam and below the vehicle frame and is displaced only by the average of movement of the two axles. Walking beam suspensions provide for greater axle articulation and improved traction over rough surfaces than common suspension systems and are favored for driven tandem axles used with vehicles intended for off road use. However, walking beam suspensions are inferior at maintaining a good ride for loaded and unloaded vehicles than are more commonly used systems, particularly air spring suspensions.

Good roll stability is an important factor in any vehicle suspension system. Roll stability is a particularly important factor in the design of suspensions for off road applications. The primary way to reduce roll and thereby improve roll stability is to increase the suspension's spring rate. However, simply increasing the suspension spring rate produces an increasingly harsh and uncomfortable ride. In order to keep the vertical spring rate low enough for reasonable levels of comfort it has become common practice to add auxiliary stabilizing elements to suspensions. This approach works well until the wheels on one side of a vehicle need to move independently of the roll coupled member. When this occurs the result is an increase in the effective vertical spring rate and a loss of suspension articulation. The loss of articulation in turn results in a loss of traction in rough terrain. High axle articulation and anti-roll stability have been partially incompatible objectives.

Air springs have given suspension designers some advantages in handling the problem of providing a good ride with roll stability in a single suspension design. Air can be added or released from an air spring on demand to adjust the spring's deflection as desired and keep the vehicle from listing due to uneven loading. Air springs alone, however, provide no inherent mechanism for stabilizing axle orientation and have tended to require extensive auxiliary stabilizing elements for the axles.

SUMMARY OF THE INVENTION

It is an object of the invention to provide a tandem axle suspension system which retains axle orientational stability while achieving good suspension articulation for off road applications.

It is another object of the invention to improve tandem axle suspension articulation in an air spring based suspension system.

It is still another object to achieve anti-roll stability while maintaining good axle articulation and a comfortable ride.

According to the invention there is provided a suspension system for a vehicle's tandem axle. The tandem axle supports from the axle outside ends, a vehicle having two major sides. For each end of the axles there is a lead air spring and a trailing air spring mounted in tandem along each major side of the vehicle. First and second lead air springs are anchored to support the vehicle from a lead axle of the tandem axle and first and second trailing air springs are anchored to support the vehicle from a trailing axle of the tandem axle. A fluid transfer channel connects the lead and trailing air springs associated on each major side. An averaging rod connects the ends of the lead and trailing axles of the tandem axle substantially adjacent the major sides.

An air spring pressurization controller is installed for each major side, with the air spring pressurization controller being responsive to displacement of the averaging rod for its respective side and further being in fluidic communication with the fluid transfer channel for the side.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
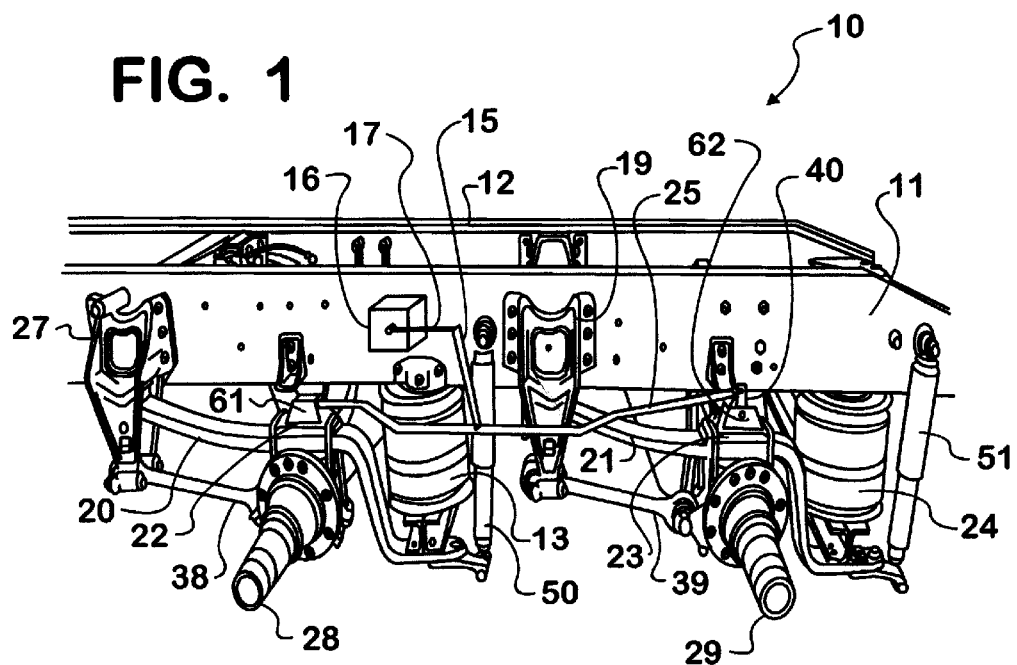
FIG. 1 is a side view of a vehicle chassis to which the suspension system according to the present invention is applied.

FIG. 1 illustrates one side of a vehicle chassis 10 to which the suspension system of the present invention has been applied. The suspension system is particularly suited for driven pairs of axles arranged in tandem with a leading or forward axle 28 and a trailing or aft axle 29. Tandem axles are commonly applied to the rear sections of trailers and trucks. The system of the present invention is preferably applied to driven axles of trucks, particularly where a high degree of suspension articulation is required to handle off road service. Reference is made herein to the driver's side and the passenger sides of a vehicle. These are illustrated as the left and right side, respectively. However, the invention is equally applicable to vehicles where the driver's side is the right side.

Axles 28 and 29 are arranged parallel to one another while perpendicular to and below a major side frame rail 11 disposed along the passenger side of a vehicle (not shown). Axles 28 and 29 are linked to the frame rail 11 by a suspension comprising several components directed to maintaining the positions of the axles relative to one another and to chassis 10. The suspension serves also to isolate the chassis 10 from shocks transmitted by wheels (not shown) connected to the ends of axles 28 and 29 to the axles and to maintain the stability of the vehicle supported on chassis 10.

Since axles 28 and 29 are, in the preferred embodiment of the invention, driven axles, additional components may be provided to counteract torque applied to the axles.

The apparatus for linking each of axles 28 and 29 to chassis 10 is essentially identical. The basic components are a combination of a half leaf spring and air spring. With respect to forward axle 28, a forward hanger bracket 27 is mounted to and extends downwardly from frame rail 11. A forward suspension swing arm 20 has sliding contact with forward hanger bracket 27 and extends as a trailing link to an axle housing 22 on top of and secured to axle 28. Swing arm 20 functions like a half leaf spring to provide roll stability relative to axle 28. Below swing arm 20 a torque rod 38 is connected as a trailing link from the bottom of hanger bracket 27 to axle 28. Forward suspension swing arm 20 extends aft of axle 28 bending downwardly and then horizontally again to provide a base for forward air spring 13. Air spring 13 is anchored between swing arm 20 and frame rail 11 to support chassis 10 above axle 28. Air spring 13 is of a conventional type which may be pressurized or depressurized to compensate for changes in load to maintain a constant vehicle height. Mounted parallel to air spring 13 between swing arm 20 and frame rail 11 is a shock absorber 50.

The basic components and their arrangement for the aft axle 29 are identical to those for the forward axle 28. An aft suspension swing arm 21 has sliding contact with hanger bracket 19 and extends as a trailing link to an axle housing 23 on top of and secured to axle 29. Below swing arm 21 a torque rod 39 is connected as a trailing link from the bottom of hanger bracket 19 to axle 29. Aft suspension swing arm 21 extends aft of axle 29 bending downwardly and then horizontally again to provide a base for aft air spring 24. Air spring 24 is anchored between swing arm 21 and frame rail 11 and supports chassis 10 from axle 29. Air spring 24 is conventional and may be pressurized or depressurized to compensate for changes in load to maintain a constant vehicle height. Mounted parallel to air spring 24 between swing arm 21 and frame rail 11 is a shock absorber 51.

The use of a half leaf spring and air spring in combination are known to the art. Air springs have conventionally been actively controlled to adapt the suspension for a vehicle to current conditions, such as load, and load shifting during cornering. The invention fluidically links the air springs on each side of the tandem axle arrangement to improve suspension articulation, in a manner akin to the articulation provided by walking beam suspensions.

Figure 2:
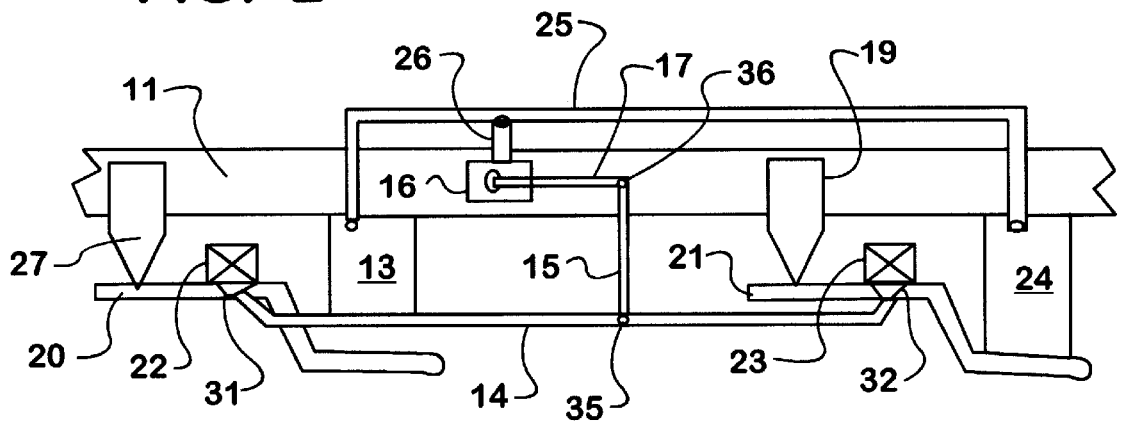
FIG. 2 is a schematic illustration of the invention.

Referring to FIGS. 1 and 2, the forward air spring and aft air spring for the driver's side of chassis 10 underlying frame rail 11 are pneumatically connected to one another by a tube 25. As the outer end of one or the other of axles 28 and 29, adjacent the driver's side of the vehicle, move upwardly or downwardly to a different degree than the adjacent axle end, air is transferred from the relatively more compressed air spring to the less compressed air spring. In effect, air springs 13 and 24 become a common air reservoir, with the reservoir isolated from the air spring reservoir supporting the opposite side of the chassis from the tandem axle. By interconnecting the air springs on one side of the vehicle, greater displacement of one or the other of the ends of axles 28 and 29 is allowed, giving the axles superior articulation compared to pneumatically isolated air springs and reproducing the benefits achieved by a walking beam suspension. As an incidental benefit of this arrangement, the resulting air volume of the common reservoir is larger than those provided by a fully isolated air springs, with the consequence that the ride of the vehicle is improved by better isolation of vehicle occupants and the load from small shocks to the system.

While linking air springs 13 and 24 in a common reservoir mimics a walking beam, height control of the air springs must still be addressed. Typically, the air pressure in air springs is adjusted to move the chassis 10 to a desired equilibrium displacement above the axles 28 and 29. In the preferred embodiment, air springs 13 and 24 are linked in common reservoir. Individual controllers for each air spring could, under some circumstances, work to cross purposes, especially if each controller is actuated by a local measurement of displacement. Unevenness in loading could lead to one height controller trying to add air to the system while the second tried to reduce air pressure.

Consequently, a single variable rate height controller 16 pressurizes the commonly linked air springs 13 and 24. An average displacement from the axles 28 and 29 to the frame rail 11 is measured and used to activate controller 16. In the preferred embodiment, the average displacement of axles 28 and 29 to a point on the frame rail 11 between the axles is used. To obtain this average displacement, an averaging beam 14 is connected between axle housing 22 over axle 28 and axle housing 23 over axle 29. At one end, averaging beam 14 is pivotally mounted in a pivot mount 31 in a bracket 61 affixed atop axle housing 22. At its opposite end, averaging beam 14 is connected to a pivoting arm 40, corresponding to point 32 in FIG. 2, which is in turn pivotally mounted in a shackle box 62. Pivoting arm 40 allows for the changes in spacing that occurs between the ends of axles 28 and 29 when the axle ends become vertically displaced from one another.

Variable rate height controller 16 is mounted on the outward face of side rail 11 and is linked to averaging beam 14 by a vertical connecting linkage 15 extending upwardly from a center pivot point 35 on the averaging beam and a horizontal connecting linkage 17 mounted between the upper end of connecting linkage 15 and controller 16. Connecting linkage 17 is connected to controller 16 to act as an actuating lever varying the rate at which controller 16 allows air to be added to or released from the air springs 13 and 24. Variable rate height controller 16 will be understood to be connected to a source of pressurized air, typically an air tank fed by a compressor (not shown). Such components are commonly available on a truck to provide air pressure for the vehicle's brake system. Controller 16 is connected to tube 25 by a connecting tube 26. Tube 25 should be sized to have low resistance to the flow of air between air springs 13 and 24. Connecting tube 26 may be of smaller diameter.

Figure 3:
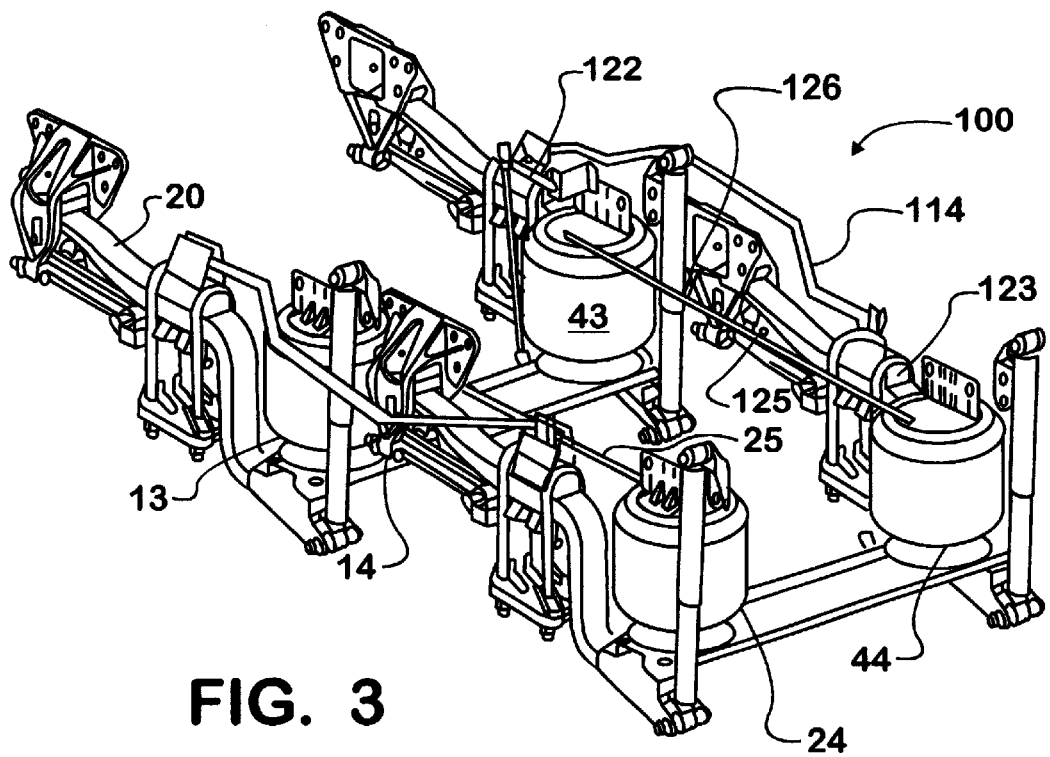
FIG. 3 is a perspective view of a suspension system illustrating location of averaging beams and pressure equalization lines.

FIG. 3 is a perspective view of suspension system 100 illustrating the positioning of four springs 13, 24, 43, and 44 to provide vehicle support from a tandem axle (not shown). The suspension system provided the passenger side of the vehicle is functionally identical to that provided the driver's side. The forward and aft pair of air springs 43 and 44 are pneumatically connected by a tube 125, to which air is added or exhausted by a connecting tube 126 to a passenger side variable height controller (not shown). Similarly, an averaging beam 114 is connected between axle housings 122 and 123. Side to side, the air spring pairs are isolated pneumatically.

Figure 4:
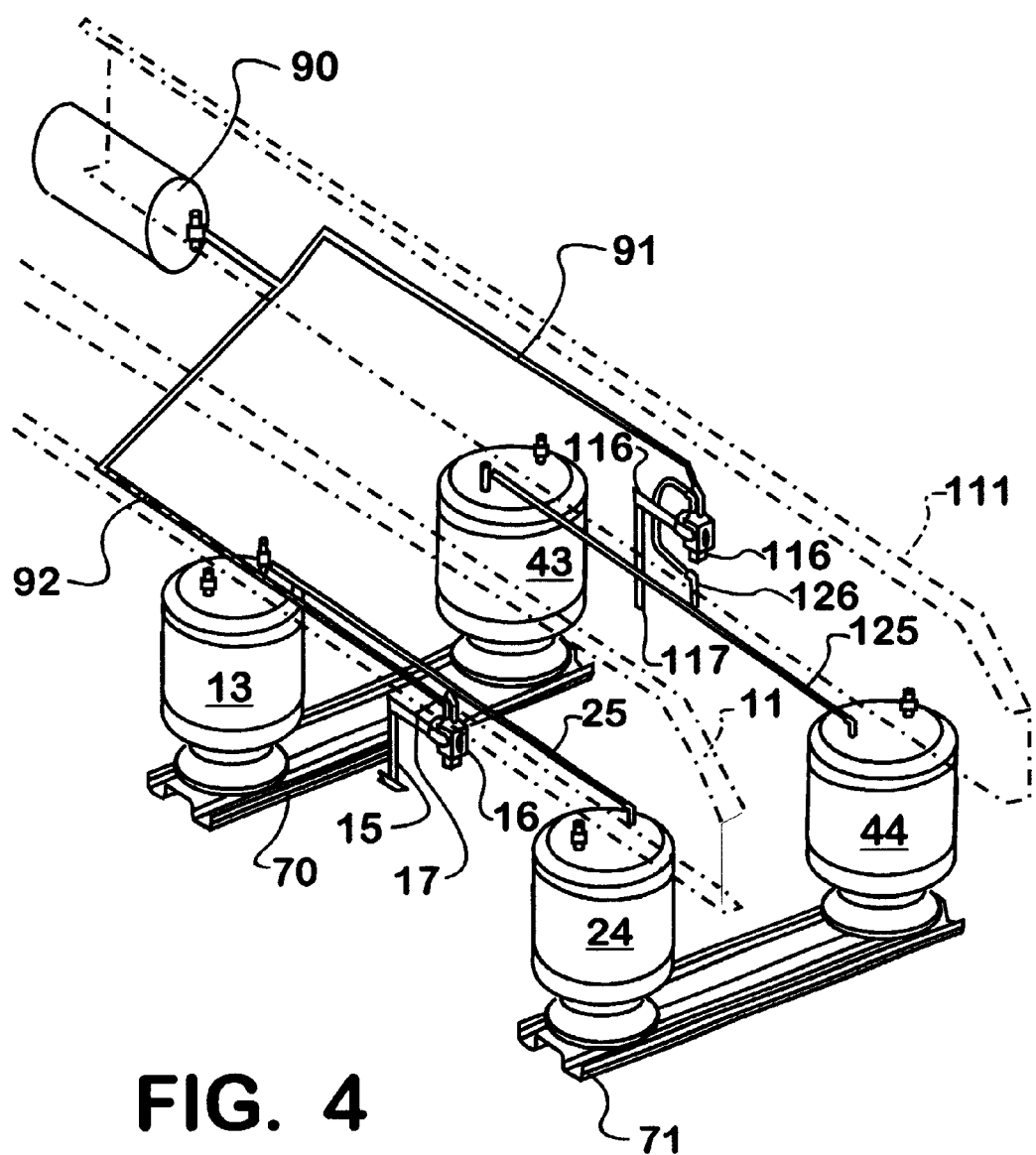
FIG. 4 is a perspective view of a pressurization system for air springs.

FIG. 4 illustrates a pressurization system for air springs 13, 24, 43 and 44. A compressed air tank 90 supplies air under pressure to variable flow rate height control valves 16 and 116 via manifolds 92 and 91, respectively. Valves 16 and 116 provide control for the rate of addition of air to or exhaustion of air from tubes 25 and 125. Valves 16 and 116 isolate the pairs of air springs from air tank 90.

The invention retains, indeed enhances, the good ride associated with air springs and the axle orientational stability provided by prior art half leaf air spring combination with air springs, while improving articulation by pneumatically interconnecting the air springs on each side of the vehicle. Air spring pressure control is effected by average axle displacement from the chassis.

While the invention is shown in only one of its forms, it is not thus limited but is susceptible to various changes and modifications without departing from the spirit and scope of the invention.

What is claimed is:

1. A suspension for a tandem axle installed on a vehicle having two major sides, the suspension comprising:
   a lead air spring and a trailing air spring mounted in tandem along each major side, first and second lead air springs being anchored to support the vehicle from a lead axle of the tandem axle and first and second trailing air springs being anchored to support the vehicle from a trailing axle of the tandem axle;
   fluid transfer channels connected between the lead and trailing air springs associated with each major side;
   averaging rods connected between the lead and trailing axles of the tandem axle substantially adjacent the major sides; and
   an air spring pressurization controller for each major side, the air spring pressurization controller being linked to the averaging rod for its respective side to respond to displacement of the averaging rod and further being in fluidic communication with the fluid transfer channel for the side.

2. A suspension for a tandem axle as claimed in claim 1, wherein the tandem axle comprises drive axles.

3. A suspension for a tandem axle as claimed in claim 2, wherein the averaging beam is linked to an axle housing for the lead axle and an axle housing for the trailing axle, with a link to one housing allowing front to aft translator to compensate for changes in displacement between the ends of the axle.

4. A suspension for a tandem axle as claimed in claim 3, wherein the lead and trailing axles are attached to the major sides of the vehicle by trailing swing arms.

5. A suspension system for a vehicle having parallel first and second sides, comprising:
   fore and aft axles arranged in tandem and perpendicular to the first and second sides of the vehicle;
   an air spring positioned with respect to the outside ends of each of the fore and aft axles for supporting a local section of the vehicle from the respective axle;
   a fluidic communication conduit for pairs of air springs along each major side of the vehicle for equalizing the air pressure in the air springs along each major side;
   means for measuring the average displacement of the outside ends of the fore and aft axles relative to each major side of the vehicle; and
   air spring pressure regulators for each major side of the vehicle responsive to the measured average displacement on a side for adjusting the air pressure in the pair of air springs located along the major side.

6. A suspension system as set forth in claim 5, further comprising:
   a trailing swing arm for attaching each major side of the vehicle to a major side of the vehicle.

7. A suspension system for a vehicle having a chassis with parallel, elongated, first and second sides, the suspension system comprising:
   fore and aft axles arranged in tandem beneath the chassis and perpendicular to the first and second sides;
   a plurality of air springs, one air spring being located with respect to each end of the fore and aft axles for supporting the chassis from the fore and aft axles;
   first and second variable flow rate height control valves, respectively mounted to the first and second sides of the chassis;
   first and second tubes independently pneumatically connecting the air springs of the plurality of air springs supporting each side of the chassis and pressurized from the first and second variable flow rate height control valves, respectively;
   first and second beams mounted with respect to the outside ends of the fore and aft axles on the first and second sides of the chassis, respectively, to measure the average displacement of the ends of the axles on a given side of the chassis from the side; and
   first and second actuators, connected between the first beam and first variable flow rate height control valve and between the second beam and the second variable flow rate height control valve.

* * * * *